(12) United States Patent
You (10) Patent No.: US 11,038,246 B2
(45) Date of Patent: Jun. 15, 2021

(54) COMPOSITE END PLATE AND BATTERY MODULE

(71) Applicant: Contemporary Amperex Technology Co., Limited, Ningde (CN)

(72) Inventor: Shubing You, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 292 days.

(21) Appl. No.: 16/225,937

(22) Filed: Dec. 19, 2018

(65) Prior Publication Data

US 2019/0207193 A1   Jul. 4, 2019

(30) Foreign Application Priority Data

Dec. 29, 2017  (CN) .......................... 201711488007.2

(51) Int. Cl.
    *H01M 2/24*        (2006.01)
    *H01M 50/528*     (2021.01)
    (Continued)

(52) U.S. Cl.
    CPC ..... *H01M 50/528* (2021.01); *H01M 10/0481* (2013.01); *H01M 50/148* (2021.01); *H01M 50/20* (2021.01); *H01M 50/209* (2021.01)

(58) Field of Classification Search
    CPC .... H01M 2/22; H01M 2/0469; H01M 2/1016; H01M 2/1061; H01M 2/1077; H01M 10/0481
    See application file for complete search history.

(56) References Cited

U.S. PATENT DOCUMENTS

2018/0212212 A1* 7/2018 Cao ..................... H01M 2/1005

FOREIGN PATENT DOCUMENTS

| CN | 204271149 U | 4/2015 |
|---|---|---|
| CN | 106654103 A | 5/2017 |

(Continued)

OTHER PUBLICATIONS

The extended European Search Report for European Application No. 18215088.8, dated Apr. 25, 2019, 10 pages.

(Continued)

*Primary Examiner* — Jane J Rhee
(74) *Attorney, Agent, or Firm* — Law Offices of Liaoteng Wang (57) ABSTRACT

The disclosure relates to a composite end plate and a battery module. The composite end plate comprises a first surface and a second surface, and comprises a rigid base plate comprising two ends and a rigid connecting plate extending in a height direction of the composite end plate. The rigid connecting plate and the rigid base plate are made of different materials. The rigid connecting plate comprises a first connecting segment, an intermediate transitional segment and a second connecting segment. The second connecting segment comprises a transferring section connected to the intermediate transitional segment and a free-end section. The two ends are fixedly connected to two respective rigid connecting plates. The first connecting segment and the free-end section are embedded in the rigid base plate. The transferring section can be fixedly connected to an external structural component. The composite end plate can be firmly connected to the side plate.

20 Claims, 7 Drawing Sheets

(51) Int. Cl.
  *H01M 10/04* (2006.01)
  *H01M 50/20* (2021.01)
  *H01M 50/148* (2021.01)
  *H01M 50/209* (2021.01)

(56) References Cited

FOREIGN PATENT DOCUMENTS

| CN | 206558558U U | 10/2017 |
| CN | 206727139U U | 12/2017 |

OTHER PUBLICATIONS

The first Office Action for Chinese Application No. 201711488007.2, dated Apr. 1, 2021, 11 pages.

\* cited by examiner

COMPOSITE END PLATE AND BATTERY MODULE

CROSS-REFERENCE TO RELATED APPLICATION

This application is based on and claims priority to Chinese Patent Application No. 201711488007.2 filed on Dec. 29, 2017, which is incorporated herein by reference in its entirety.

FIELD

The present disclosure relates to the technical field of battery, and in particular to a composite end plate and a battery module.

BACKGROUND

With continuous developments of technologies, power batteries are applied to more and more areas involving production and life. The power battery, also known as secondary battery, is a rechargeable battery. The power batteries are widely used. The power batteries with a low capacity may be applied to small electric vehicles, and the power batteries with a high capacity may be applied to large electric vehicles, such as hybrid electric vehicles or electric cars. When the power batteries were used in groups, a busbar is needed to connect each of the power batteries in series or in parallel. Usually, the busbar is welded to a positive electrode and a negative electrode of the power battery. Each power battery comprises a plurality of battery modules. Each battery module comprises a plurality of batteries, end plates and side plates for fixing the batteries. The end plates and the side plates are disposed to surround all the batteries. Existing end plate is structured as a single component. Both the end plate and the side plate are made of aluminum. The end plate and the side plate are fixedly mounted through welding. With an increasing capacity of battery module, the battery may expand in some cases and thus exert expansion forces on the end plates and the side plates. This will render the end plates and the side plates liable to deformation and displacement, which will cause failure of welding seams between the side plates and the end plates. Therefore, there is a problem of low structural strength in traditional battery modules.

SUMMARY

According to embodiments of the disclosure, there is provided a composite end plate and a battery module. When the composite end plate is applied into a battery module, it can be firmly connected to side plates, thus it is possible to effectively resist expansion and deformation forces resulted from battery expansion, prevent an overall dimension of the battery module from being enlarged, and facilitate safe and reliable application of the battery module.

In one aspect, the disclosure provides a composite end plate for a battery module. The composite end plate comprises a first surface and a second surface disposed opposite to each other in its thickness direction, and the first surface can be disposed to face a battery of the battery module. The composite end plate comprises: a rigid base plate comprising two ends opposite to each other in a width direction of the composite end plate; and a rigid connecting plate extending in a height direction of the composite end plate. The rigid connecting plate and the rigid base plate are made of different materials. The rigid connecting plate comprises a first connecting segment, an intermediate transitional segment and a second connecting segment disposed successively in the width direction. The second connecting segment comprises a transferring section connected to the intermediate transitional segment and a free-end section. The two ends of the rigid base plate are fixedly connected to two respective rigid connecting plates, the first connecting segment and the free-end section of the second connecting segment of the rigid connecting plate are embedded in the rigid base plate such that the rigid connecting plate is fixedly connected to the rigid base plate, and the transferring section of the second connecting segment is exposed from the second surface and can be fixedly connected to an external structural component.

According to an aspect of embodiments of the disclosure, the rigid base plate and the rigid connecting plate are made of metal materials; or the rigid base plate is made of non-metal material, and the rigid connecting plate is made of metal material.

According to an aspect of embodiments of the disclosure, the intermediate transitional segment extends in the thickness direction, and the first connecting segment and the second connecting segment are disposed at two respective sides of the intermediate transitional segment such that the rigid connecting plate has a stepped shape.

According to an aspect of embodiments of the disclosure, the first connecting segment and the second connecting segment are disposed in parallel to each other.

According to an aspect of embodiments of the disclosure, the rigid connecting plate and the rigid base plate are detachably connected.

According to an aspect of embodiments of the disclosure, the rigid base plate comprises a positioning groove having a shape matching with that of the rigid connecting plate, the positioning groove extends in the height direction of the composite end plate, and the rigid connecting plate can be inserted into the positioning groove along the height direction.

According to an aspect of embodiments of the disclosure, the first connecting segment and the free-end section of the second connecting segment are fixedly connected to the rigid base plate via fasteners, respectively.

According to an aspect of embodiments of the disclosure, both the first connecting segment and the free-end section of the second connecting segment comprise first recesses, and the rigid base plate comprises first protrusions for meshing with the first recesses such that the rigid connecting plate is fixedly connected to the rigid base plate.

According to an aspect of embodiments of the disclosure, the first recess is a notch or through hole According to an aspect of embodiments of the disclosure, a portion of the rigid base plate protruding toward the first recess forms the first protrusion.

According to an aspect of embodiments of the disclosure, the end of the rigid base plate comprises a positioning surface on the same side with the second surface, and a surface of the transferring section of the second connecting segment away from the first surface is flush with the positioning surface.

According to embodiments of the disclosure, the composite end plate comprises the rigid base plate and the rigid connecting plate. The rigid connecting plate is fixedly connected to the rigid base plate. The two ends of the rigid base plate opposite to each other in its width direction are connected to two respective rigid connecting plates. A surface of the rigid connecting plate is exposed at the same side with the second surface of the composite end plate and can be fixedly connected to the side plate. The rigid connecting plate provides an indirect connection between the rigid base plate and an external structural component. The side plate can be fixedly connected to the rigid base plate via the rigid connecting plate, thus it is beneficial to select different materials of the side plate and the rigid connecting plate according to actual requirements in application. The material of the rigid base plate can also be flexibly selected. Thus, it is possible to select low density material to achieve an overall lightweight design of the composite end plate and thereby an overall lightweight design of the battery module. The rigid connecting plate and the rigid connecting plate can be made of same material and can be connected through welding. As such, the rigid connecting plate and the side plate can be fixedly connected through a welding process. Welding seam formed between them has high seam strength and good resistance to tension such that the composite end plate can bear larger expansion forces resulted from the battery expansion and it is possible to improve overall structural reliability of the battery module.

In another aspect, the disclosure provides a battery module comprising: a plurality of batteries arranged side by side; and a fixing frame enclosing all the batteries at a periphery of the batteries. The fixing frame comprises two composite end plates as described above and two side plates. The composite end plates and the side plates are successively and alternatively disposed to surround the batteries. The side plate and the rigid connecting plate are made of an identical material and the side plate is fixedly connected to the transferring section of the second connecting segment.

BRIEF DESCRIPTION OF THE DRAWINGS

Features, advantages, and technical effects of exemplary embodiments of the present disclosure will be described below with reference to accompanying drawings.

The views are not necessarily plotted in actual proportion in the drawings.

Reference signs in the drawings:
1 composite end plate;
1*a* first surface;
1*b* second surface;
X width direction;
Y thickness direction;
Z height direction;
11 rigid base plate;
11*a* end;
11*b* connection portion;
110 central axis;
111 mounting hole;
112 preformed though-hole;
113 positioning groove;
114 first protrusion;
115 positioning surface;
12 rigid connecting plate;
121 first connecting segment;
122 intermediate transitional segment;
123 second connecting segment;
123*a* transferring section;
123*b* free-end section;
124 first recess;
2 side plate.

DETAILED DESCRIPTION

Below, embodiments of the present disclosure will be further described in detail with reference to the drawings and embodiments. The detailed description according to the embodiments and the accompanying drawings are intended to exemplary illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are configured for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding of the disclosure, a composite end plate according to embodiments of the disclosure will be described below in detail with reference to FIGS. 1 to 7.

Figure 1:
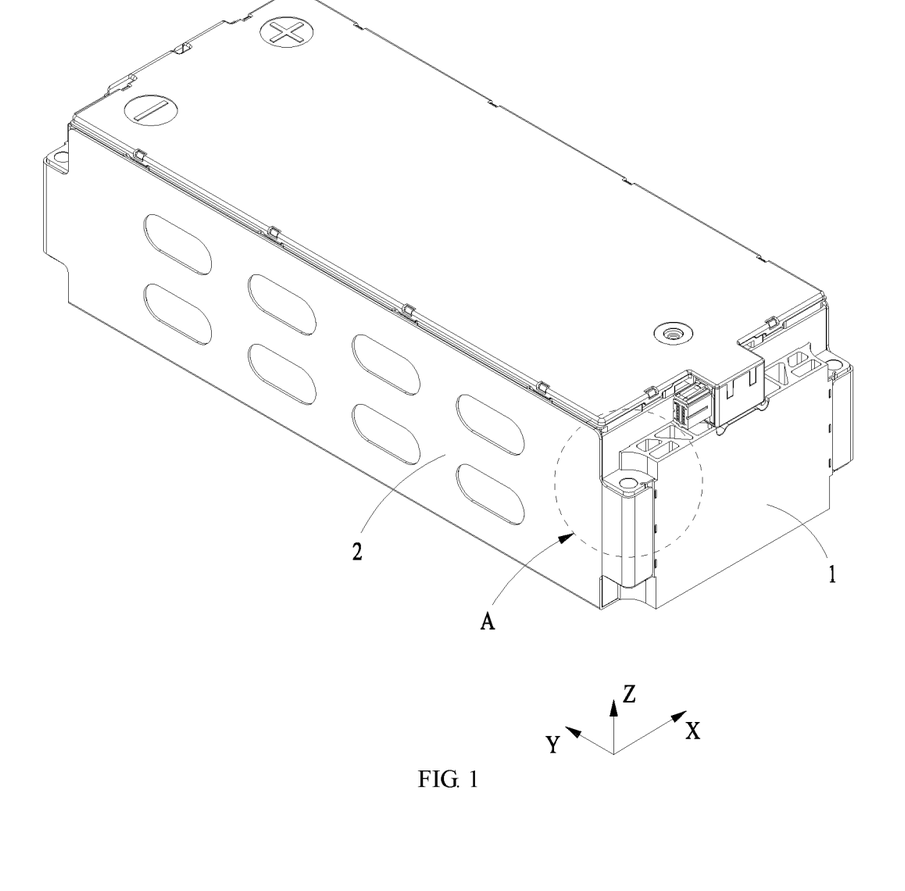
FIG. 1 is a structural schematic diagram of a battery module according to an embodiment of the disclosure.
Figure 2:
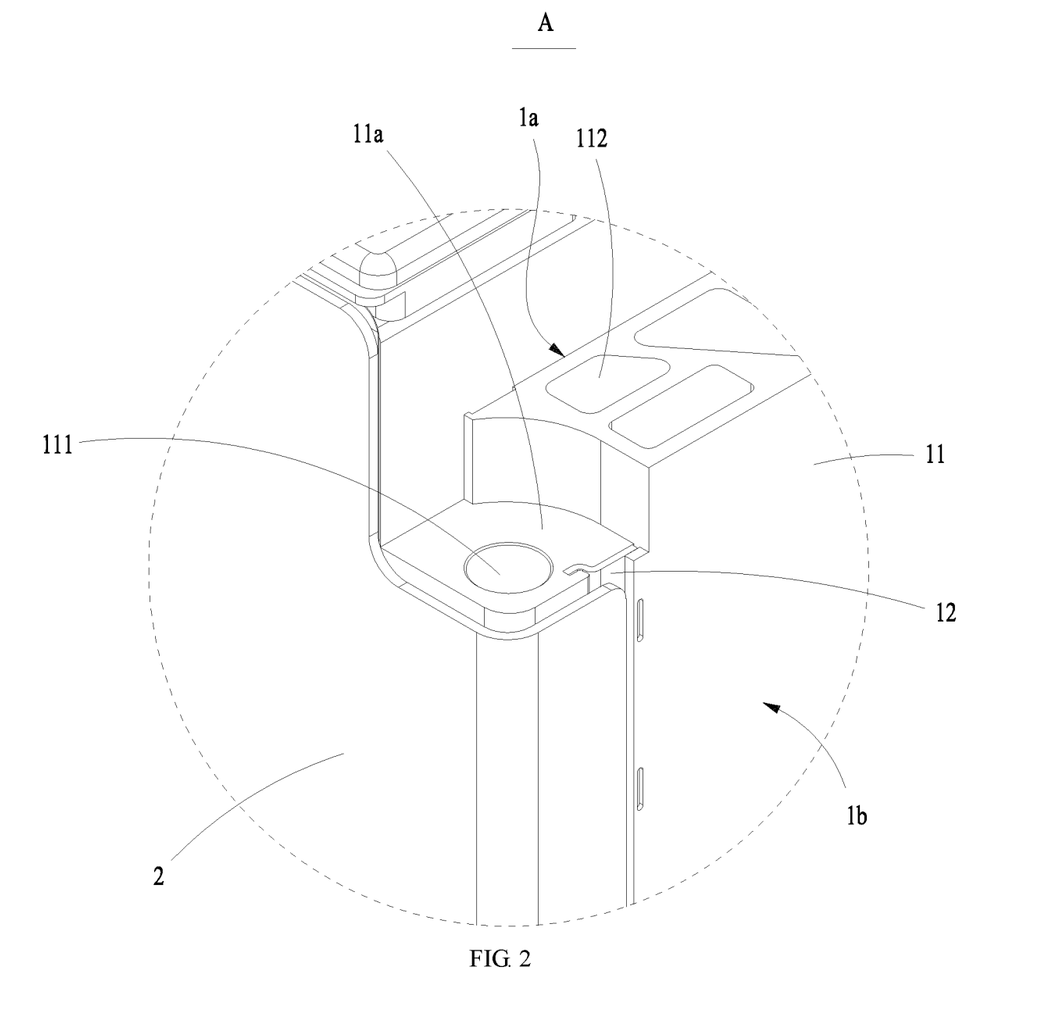
FIG. 2 is an enlarged partial view of a portion A in FIG. 1.
Figure 3:
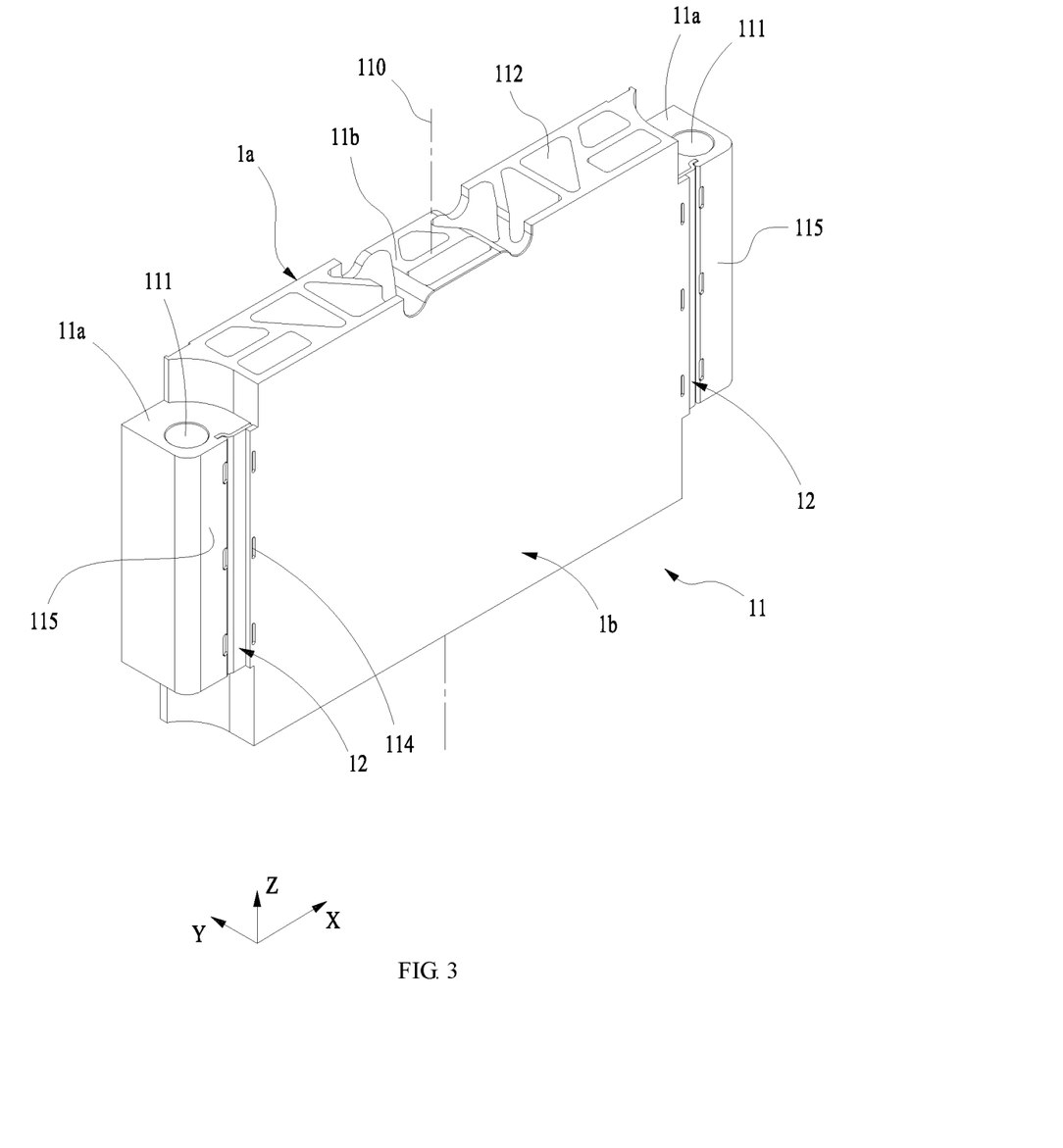
FIG. 3 is a structural schematic diagram of a composite end plate according to an embodiment of the disclosure.
Figure 4:
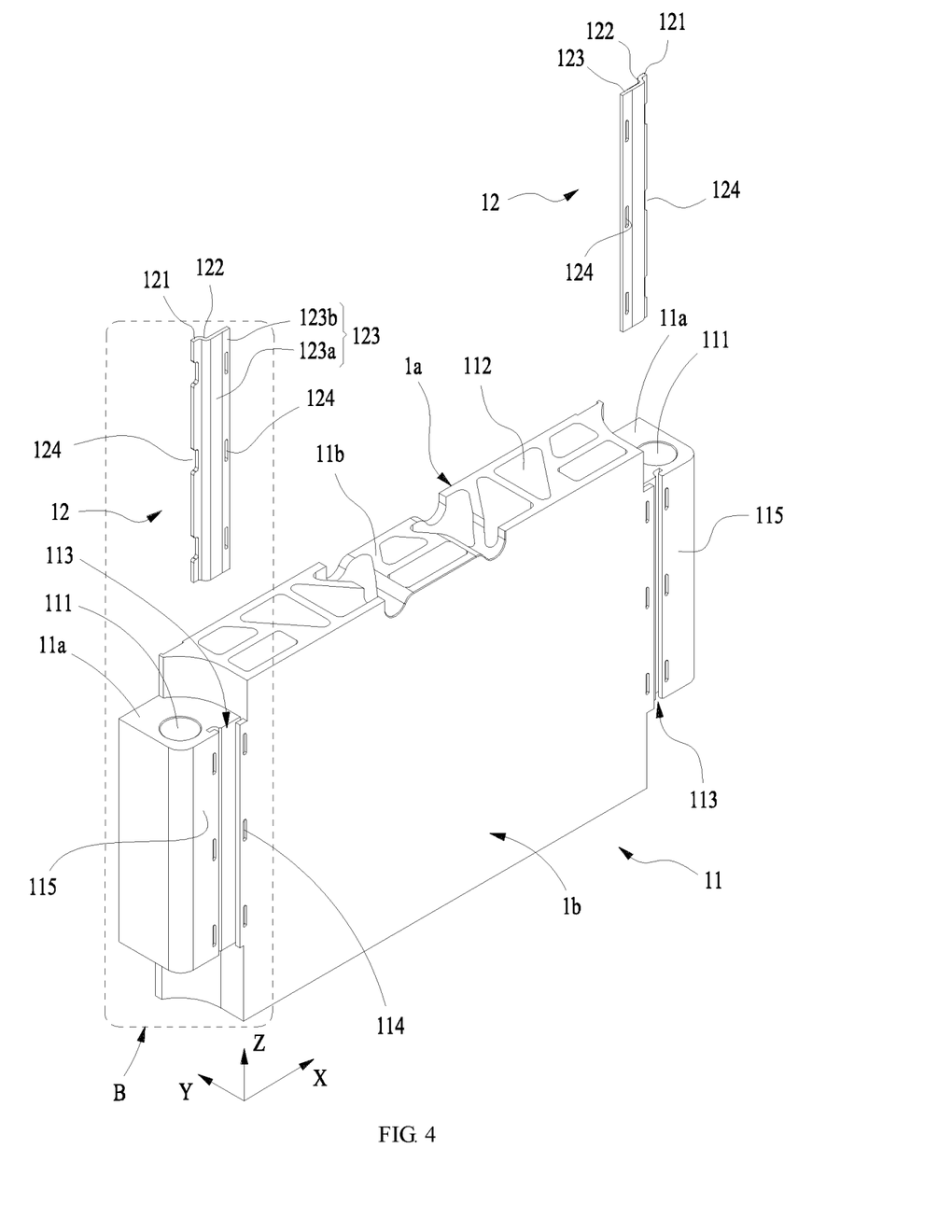
FIG. 4 is an exploded structural view of a composite end plate according to an embodiment of the disclosure.
Figure 5:
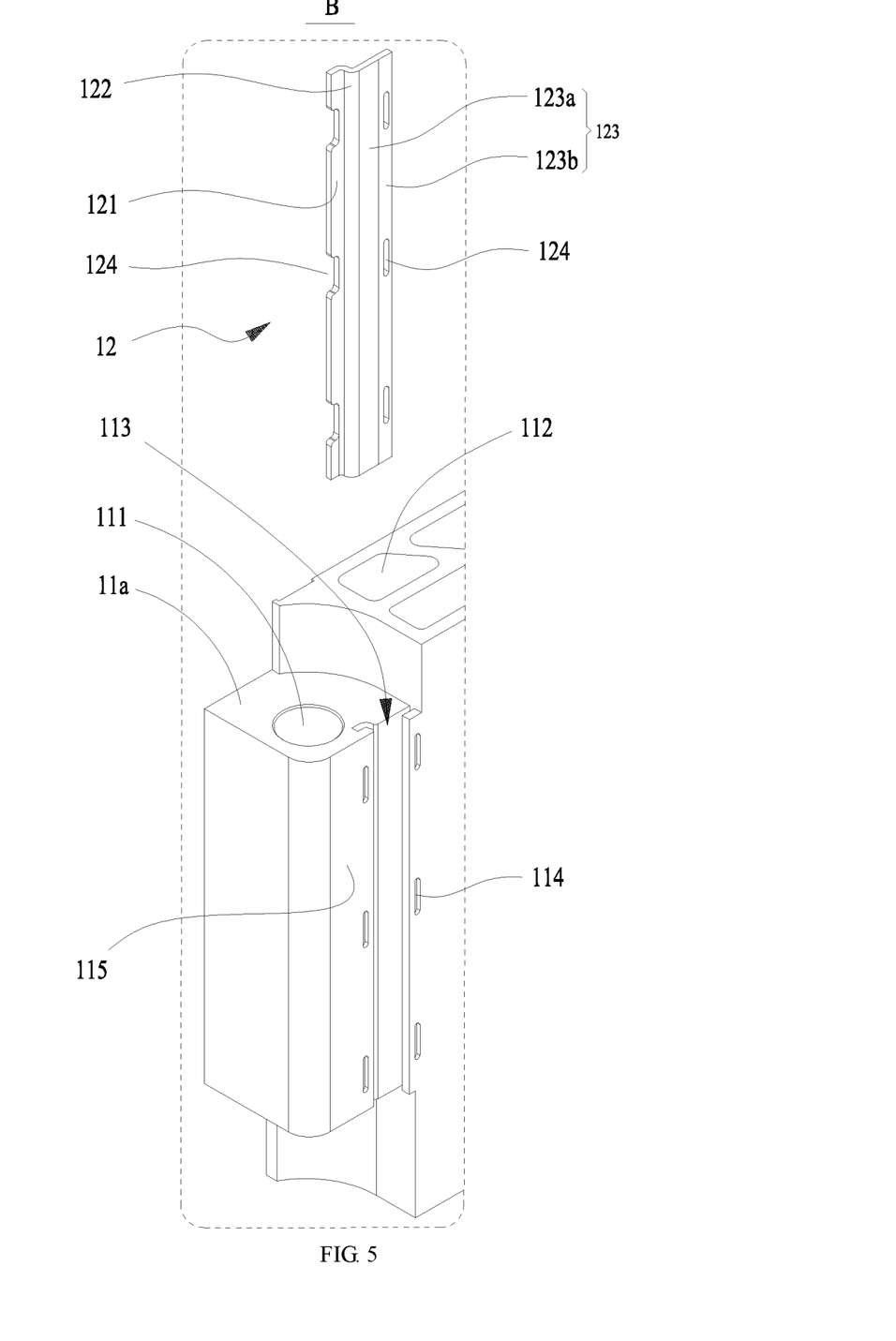
FIG. 5 is an enlarged partial view of a portion B in FIG. 4.
Figure 6:
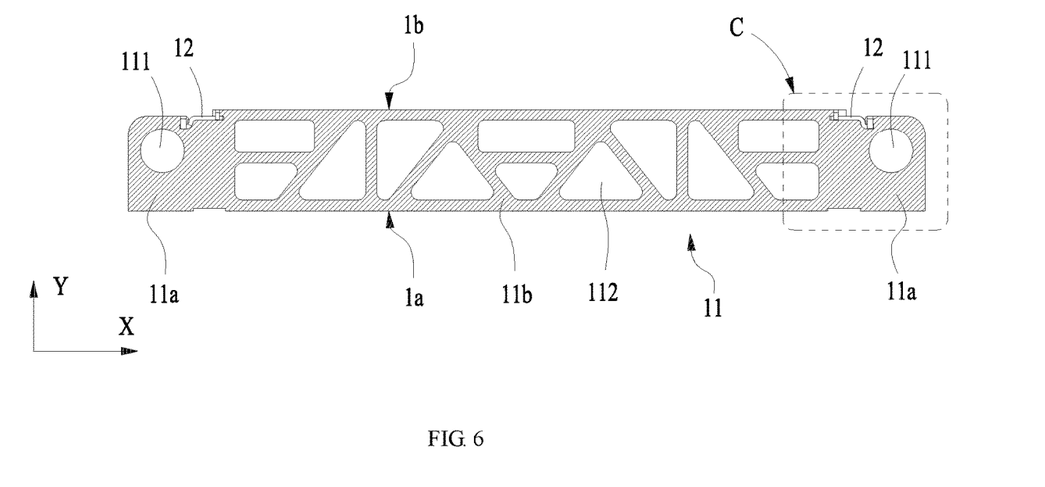
FIG. 6 is a sectional structural view of a composite end plate according to an embodiment of the disclosure.
Figure 7:
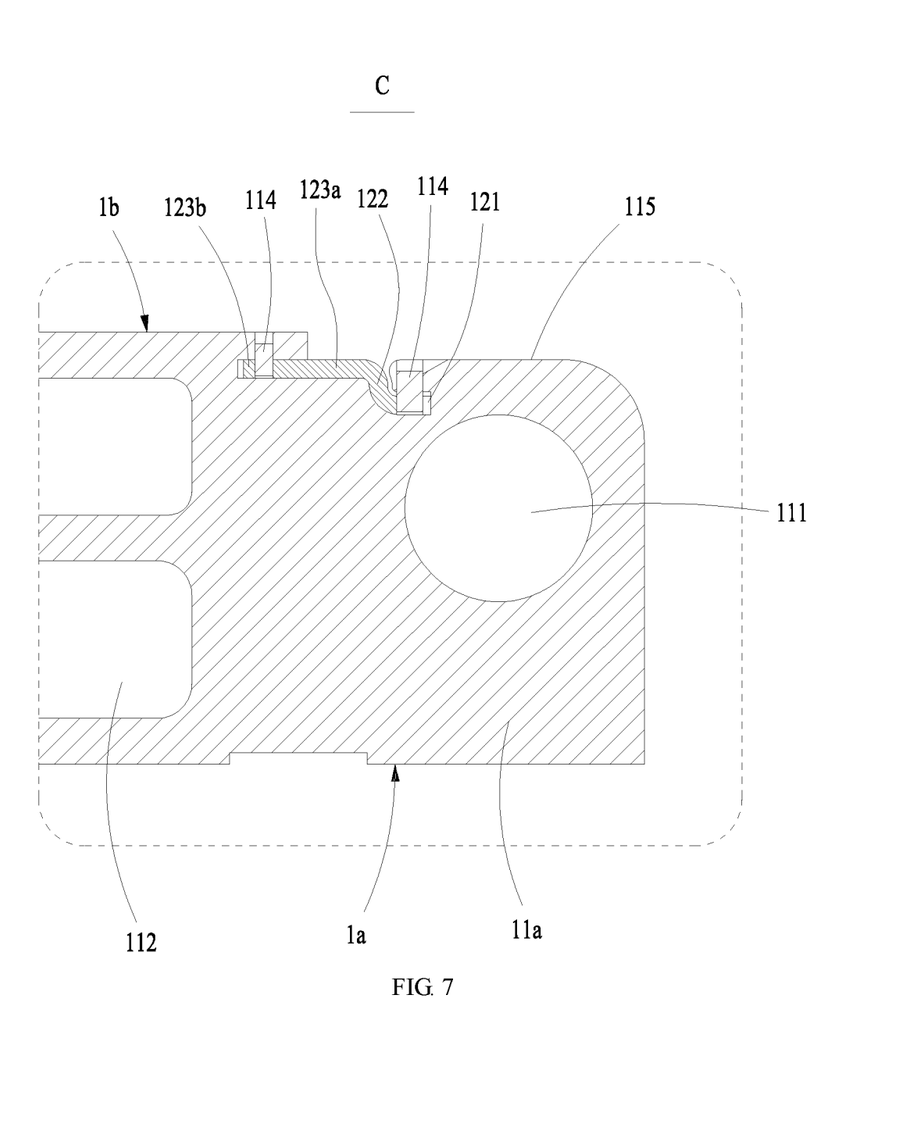
FIG. 7 is an enlarged partial view of a portion C in FIG. 6.

FIG. 1 schematically shows an overall structure of a battery module according to an embodiment. FIG. 2 is an enlarged partial view of a portion A in FIG. 1. FIG. 3 schematically shows an overall structure of a composite end plate 1 according to an embodiment. FIG. 4 schematically shows an exploded structure of a composite end plate 1 according to an embodiment. FIG. 5 is an enlarged partial view of a portion B in FIG. 4. FIG. 6 schematically shows a sectional structure of a composite end plate 1 according to an embodiment. FIG. 7 is an enlarged partial view of a portion C in FIG. 6.

As shown in FIG. 1, the composite end plate 1 according to embodiments of the disclosure is applied in a battery module. The battery module according to the embodiment comprises a plurality of batteries (not shown) arranged along a direction, two composite end plates 1 according to embodiments of the disclosure and two side plates 2. The batteries form an assembly. The two composite end plates 1 are disposed at two opposite sides of the assembly in the battery arrangement direction. The two side plates 2 are spaced apart in a direction perpendicular to the battery arrangement direction, and are connected to the two composite end plates 1, respectively. The two composite end plates 1 and the two side plates 2 together form a fixing frame for fixing the assembly. The side plate 2 can comprise multiple holes to reduce its weight and facilitate heat dissipation of the batteries.

The composite end plate 1 according to the embodiment has a predetermined width, thickness and height, which can be flexibly selected according to practical requirements. The composite end plate 1 has a first surface 1a and a second surface 1b opposite to each other in its thickness direction Y. The batteries are arranged side by side in the thickness direction Y of the composite end plate 1. When the composite end plate 1 is applied in the battery module, the first surface 1a of the composite end plate 1 faces the battery. The first surface 1a is generally a flat surface and substantially contacts with a large flat surface of the battery with a rectangular shape to avoid squeezing a case of the battery. The second surface 1b of the composite end plate 1 faces away from the batteries but is oriented to external environment.

The composite end plate 1 according to the embodiment comprises a rigid base plate 11. The rigid base plate 11 according to the embodiment comprises two ends 11a opposite to each other in a width direction X and a connection portion 11b between the two ends 11a. Each of the two ends 11a comprises a screw mounting hole 111 extending in a height direction Z of the composite end plate 1. A screw can be easily inserted into the mounting hole 111 to fixedly connect the rigid base plate 11 to an external structural component such that the battery module and the external structural component can be fixedly connected to each other. Optionally, the external structural component according to the embodiment can be a battery box for accommodating the battery module.

As shown in FIG. 2, the connection portion 11b according to the embodiment comprises a plurality of preformed though-holes 112 extending in the height direction Z. The rigid base plate 11 comprises a top portion and a bottom portion opposite to each other in the height direction Z. Each preformed though-hole 112 passes through the top portion and the bottom portion of the rigid base plate 11. On one side, the rigid base plate 11 with the preformed though-hole 112 has a light weight, thus it facilitates reducing an overall weight of the composite end plate 1 and improving an overall lightweight design of the battery module. On another side, the rigid base plate 11 with the preformed though-hole 112 has good rigidity to improve its resistance to deformation, and can bear more stress without deformation. On yet another side, the preformed though-holes 112 of the rigid base plate 11 can serve as heat dissipation channels to provide additional heat dissipation for a battery adjacent to the rigid base plate 11 and reduce the battery's temperature. Optionally, the preformed though-hole 112 has a circular, rectangular or triangular shape in its cross-section.

As shown in FIG. 3 and FIG. 4, the composite end plate 1 according to the embodiment comprises two rigid connecting plates 12. The rigid connecting plate 12 according to the embodiment extends in the height direction Z of the composite end plate 1. At each end 11a of the rigid base plate 11, there is arranged a rigid connecting plate 12. Thereby, the two rigid connecting plates 12 are spaced apart in the width direction X of the composite end plate 1. A portion of the rigid connecting plate 12 exposed at the same side with the second surface 1b can be fixedly connected to the side plate 2. When the composite end plate 1 is applied in the battery module, one side plate 2 is fixedly connected to one rigid connecting plate 12, and the other side plate 2 is fixedly connected to the other rigid connecting plate 12. As such, due to the connection of the rigid connecting plate 12, the side plate 2 can be fixedly connected to the whole composite end plate 1 via the rigid connecting plate 12. It should be appreciated that at each end 11a of the rigid base plate 11, there may be arranged two or more rigid connecting plates 12 according to requirements in product application.

When there are two rigid connecting plates 12 in the composite end plate 1 according to the embodiment, the two rigid connecting plates 12 is symmetrically disposed with respect to a central axis 110 of the rigid base plate 11. The central axis 110 extends in the height direction Z. When the side plates 2 act forces on the two rigid connecting plates 12 respectively, the composite end plate 1 as a whole is in a condition of force equilibrium. It is possible to prevent a case in which when the composite end plate 1 is under the action of forces, a rotating torque at an end 11a of the rigid base plate 11 in the width direction X will be larger than a rotating torque at the other end 11 and thus the composite end plate 1 as a whole rotates around the central axis 110 of the rigid base plate 11. The overall positional stability of the composite end plate 1 can be improved.

According to the embodiment, the rigid connecting plate 12 and the rigid base plate 11 are made of different materials. Optionally, both the rigid base plate 11 and the rigid connecting plate 12 are made of metal material. Alternatively, the rigid base plate 11 is made of non-metal material, and the rigid connecting plate 12 is made of metal material. The rigid connecting plate 12 and the side plate 2 are made of identical material. Each free end of the two side plates 2 can be bent to a side of a second surface 1b of a composite end plate 1 and welded to a portion of a rigid connecting plate 12 exposed at the same side with the second surface 1b. When a battery is expanded and deformed, such expansion and deformation will extend the side plate 2, which then is mainly subjected to tensile stress. After two side plates 2 and two composite end plates 1 are fixedly connected, the side plates 2 can tighten the batteries together through the composite end plates 1, and thereby can resist expansion and deformation forces resulted from the expansion of the batteries.

In an embodiment, both the side plate 2 and the rigid connecting plate 12 are made of steel, thus they can be fixedly connected through welding. Such connection is simple and easy to operate. When the side plate 2 of the battery module is made of steel and the batteries apply expansion forces to the side plate 2, since the steel has high yield strength, the stress generated in the side plate 2 is less than the yield strength of the steel. Thereby, it is effectively ensured that the side plate 2 will not be subject to large tensile deformation. As such, a structure of the battery module adopting the steel side plate 2 can effectively prevent the battery module from being deformed and thus can ensure the length of the battery module to meet the design requirements. Preferably, both the side plate 2 and the rigid connecting plate 12 are made of stainless steel, which provides high connection strength and good corrosion resistance.

The side plate 2 and the rigid connecting plate 12, both of which are made of steel, are welded together to form a welding joint with high connection strength. As such, the side plate 2 and the rigid connecting plate 12 have a welding seam with high strength, which improves resistance to tensile stress. Thereby, the composite end plate 1 can bear larger expansion forces from the batteries. It is possible to avoid a case in which the expansion forces resulted from the expansion of the batteries easily break the welding joint. It is possible to improve overall structural reliability of the battery module and effectively prevent the dimension of the battery module from being changed due to the expansion of the batteries. It should be appreciated that both the side plate 2 and the rigid connecting plate 12 can be made of other identical material which can meet the requirements for connection strength.

According to embodiments of the disclosure, since the composite end plate 1 is connected to the side plate 2 via the rigid connecting plate 12, the material of the rigid base plate 11 can be flexibly selected. When the side plate 2 and the rigid connecting plate 12, both of which are made of an identical metal material, have a connection stiffness meeting the requirements, the rigid base plate 11 can be made of materials with low density. Optionally, the rigid base plate 11 can be made of engineering plastics, glass fiber reinforced plastics, carbon fibers and other materials. Thus, it is possible to reduce an overall weight of the composite end plate 1 and improve the overall lightweight design of the battery module. Optionally, the rigid base plate 11 can be made of aluminum or aluminum alloy, which can be processed and machined in an extrusion molding process and a machining process.

As shown in FIG. 4 and FIG. 5, the rigid connecting plate 12 according to embodiments of the disclosure comprises a first connecting segment 121, an intermediate transitional segment 122 and a second connecting segment 123 disposed successively in the width direction X. The second connecting segment 123 comprises a transferring section 123a connected to the intermediate transitional segment 122 and a free-end section 123b away from the intermediate transitional segment 122 and connected to the transferring section 123a. The first connecting segment 121 and the free-end section 123b of the rigid connecting plate 12 are embedded in the rigid base plate 11 such that the rigid connecting plate 12 is fixedly connected to the rigid base plate 11. The transferring section 123a of the second connecting segment 123 is exposed from the second surface 1b and can be fixedly connected to the side plate 2.

In an embodiment, the rigid connecting plate 12 and the rigid base plate 11 can be connected in a non-detachable manner. Optionally, the rigid base plate 11 is made of engineering plastics, and the first connecting segment 121 and the free-end section 123b of the second connecting segment 123 of the rigid connecting plate 12 can be directly embedded in the rigid base plate 11 through injection molding. Optionally, the rigid base plate 11 can be made of aluminum, the first connecting segment 121 and the free-end section 123b of the second connecting segment 123 of the rigid connecting plate 12 can be directly embedded in the rigid base plate 11 through mold casting.

Optionally, the rigid base plate 11 is made of aluminum and the rigid connecting plate 12 is made of steel. The rigid connecting plate 12 and the rigid base plate 11 can generate an aluminum-steel composite through extrusion molding to form the composite end plate 1. In the extrusion molding process, the cleaned rigid connecting plate 12 and rigid base plate 11 are extruded in an extrusion die with specified processing parameters to form a firm composite structure. In the combining of different metal materials in this way, it performs the molding process through the action of heat and pressure during the extrusion, such that the composite end plate 1 formed of the rigid connecting plate 12 and the rigid base plate 11 provides firm connection and good resistance to deformation.

Optionally, the rigid base plate 11 comprises a positioning groove 113 extending in the height direction Z. The opening of the positioning groove 113 is disposed in a surface of the rigid base plate 11 at the same side with the second surface 1b of the composite end plate 1. The rigid connecting plate 12 is inserted into the positioning groove 113 through the first connecting segment 121 and the free-end section 123b of the second connecting segment 123 and thus connected to the rigid base plate 11. The transferring section 123a of the second connecting segment 123 of the rigid connecting plate 12 corresponds to the opening of the positioning groove 113. In an example, the positioning groove 113 has a stepwise shape in its cross section.

As shown in FIG. 5 and FIG. 7, both the first connecting segment 121 and the free-end section 123b of the second connecting segment 123 of the rigid connecting plate 12 comprise first recesses 124. The rigid base plate 11 comprises first protrusions 114. The first protrusion 114 on the rigid base plate 11 is inserted into and meshed with the first recess 124 in the rigid connecting plate 12 such that the rigid connecting plate 12 is fixedly connected to the rigid base plate 11. Preferably, the first protrusion 114 and the first recess 124 have matching shapes to improve connection stability. More preferably, both the first recess 124 and the first protrusion 114 have strip shapes extending in the height direction.

In an example, the rigid connecting plate 12 according to the embodiment is first inserted into the positioning groove 113 at a predetermined position. Compressive force is applied to a portion of the rigid base plate 11 corresponding to the first recess 124 in the rigid connecting plate 12, such that the portion is extruded and deformed, thus it protrudes toward and inserts into the first recess 124. Then, the rigid connecting plate 12 and the rigid base plate 11 are connected. The portion of the rigid base plate 11, which is deformed under the compressive force, forms the first protrusion 114. In this embodiment, the rigid connecting plate 12 and the rigid base plate 11 are fixedly connected and thus cannot be detached from each other. Optionally, a punching or extrusion process can be used to apply the compressive force to the rigid base plate 11.

In an example, the rigid connecting plate 12 according to the embodiment is first inserted into the positioning groove 113 at a predetermined position. Compressive force is applied to a portion of the rigid base plate 11 corresponding to the first recess 124 in the rigid connecting plate 12, such that the portion is partly peeled to form the first protrusion 114. In this case, the first protrusion 114 is a separate structural element. One end of the first protrusion 114 enters into the first recess 124, and the other end is connected to the remaining portion of the rigid base plate 11. The rigid connecting plate 12 and the rigid base plate 11 can also be fixedly connected. Optionally, a punching process can be used to apply the compressive force to the rigid base plate 11.

In an example, the rigid base plate 11 is made of engineering plastics. When an injection molding process is used to fixedly connect the rigid connecting plate 12 and the rigid base plate 11, a portion of the rigid base plate 11 will flow into the first recess 124 and solidifies there to form the first protrusion 114.

Further optionally, each of the first connecting segment 121 and the free-end section 123b of the second connecting segment 123 of the rigid connecting plate 12 comprises two or more first recesses 124. The two or more first recesses 124 are disposed along the height direction. The first recess 124 according to the embodiment can be notch or through hole. In an example, the first recess 124 in the first connecting segment 121 of the rigid connecting plate 12 is a notch. The notch is recessed toward the intermediate transitional segment 122 from an edge of the first connecting segment 121 away from the intermediate transitional segment 122. The first recess 124 in the free-end section 123b of the second connecting segment 123 is a through hole. The through hole extends in the thickness direction Y of the composite end plate 1.

In an example, the rigid connecting plate 12 can be detachably connected to the rigid base plate 11 such that the rigid connecting plate 12 and the rigid base plate 11 can be separately manufactured and then assembled together, and it is convenient to change or maintain the rigid connecting plate 12. Optionally, the positioning groove 113 is disposed in the rigid base plate 11 and extends in the height direction Z. The opening of the positioning groove 113 is disposed in a surface of the rigid base plate 11 at the same side with the second surface 1b. The rigid connecting plate 12 is inserted into the positioning groove 113 through the first connecting segment 121 and the free-end section 123b of the second connecting segment 123 and thus connected to the rigid base plate 11.

Optionally, both of the first connecting segment 121 and the free-end section 123b of the second connecting segment 123 of the rigid connecting plate 12 form an interference fit with the positioning groove 113. A force is applied to the rigid connecting plate 12 to generally push it into the positioning groove 113 such that they can be fixedly connected. The transferring section 123a of the second connecting segment 123 corresponds to the opening of the positioning groove 113. As such, the rigid connecting plate 12 and the rigid base plate 11 can be conveniently assembled with less assembling steps, and it is possible to improve the assembling efficiency.

Optionally, an adhesive is first applied on outer surfaces of the first connecting segment 121 and the free-end section 123b of the second connecting segment 123 of the rigid connecting plate 12 and/or on corresponding inner surfaces of the positioning groove 113, and then the rigid connecting plate 12 is inserted into the positioning groove 113. After an aging treatment, both the first connecting segment 121 and the free-end section 123b of the second connecting segment 123 of the rigid connecting plate 12 can be firmly attached to surfaces of the rigid base plate 11 in which the positioning groove 113 is formed. As such, it is possible to reduce the required machining precisions of the rigid connecting plate 12 and the positioning groove 113 of the rigid base plate 11, reduce difficulty and cost of manufacturing and improve manufacturing efficiency.

Optionally, both the first connecting segment 121 and the free-end section 123b of the second connecting segment 123 of the rigid connecting plate 12 can be fixedly connected to the rigid base plate 11 via fasteners (not shown). When the rigid connecting plate 12 is matched with the positioning groove 113 in the rigid base plate 11, the rigid connecting plate 12 and the rigid base plate 11 will be connected via the fasteners. It is possible to improve connection strength of the rigid connecting plate 12 and the rigid base plate 11.

In an example, the fasteners are elastic snap fasteners on the first connecting segment 121 and on the free-end section 123b of the second connecting segment 123 of the rigid connecting plate 12. A retaining groove is disposed in a surface of the rigid base plate 11 in which the positioning groove 113 is formed. The retaining groove is in communication with the positioning groove 113. When the rigid connecting plate 12 is inserted into the positioning groove 113, the snap fastener in the rigid connecting plate 12 can fit into the retaining groove to lock the rigid connecting plate 12 and the rigid base plate 11. As such, the rigid connecting plate 12 and the rigid base plate 11 can be conveniently and quickly assembled, and such connection is easy to operate.

In an example, through holes extending in the thickness direction Y are disposed in both the first connecting segment 121 and the free-end section 123b of the second connecting segment 123 of the rigid connecting plate 12. Connecting through holes extending in the thickness direction Y are disposed in the rigid base plate 11. The connecting through holes are in communication with the positioning groove 113. The rigid connecting plate 12 is matched with the positioning groove 113, and the through holes in the rigid connecting plate 12 align with the connecting through holes in the rigid base plate 11. Fasteners are inserted into the through holes and the connecting through holes, and connect the rigid connecting plate 12 and the rigid base plate 11 together.

More optionally, the fastener is a locking pin. A part of the locking pin is in the through hole and the other part is in the connecting through hole, such that the rigid connecting plate 12 is locked to the rigid base plate 11. The locking pin can be conveniently mounted and provide reliable connection.

More optionally, the fastener is a screw. The through hole in the rigid connecting plate 12 is a threaded hole. A shank of the screw passes through and connects the connecting through hole in the rigid base plate 11 and the through hole via the threads, while a head of the screw contacts with the rigid base plate 11 to perform the locking. Furthermore, the rigid base plate 11 can further comprise a clearance hole coaxial with the connecting through hole. The clearance hole is in communication with the positioning groove 113. The connecting through hole, the positioning groove 113 and the clearance hole are successively disposed in the thickness direction Y. The part of the screw that passes through the through hole can enter into the clearance hole, such that the dimension of the screw can be flexibly selected. Two ends of the screw can be connected to the rigid base plate 11 to improve the connection strength. Furthermore, the connecting through hole is a stepped hole such that the head of the screw can fall into the rigid base plate 11. It can prevent at least a part of the head from protruding and thus interfering with other components.

In an embodiment, the rigid base plate 11 comprises the first protrusions 114 protruding toward the positioning groove 113. The first protrusion 114 protrudes and extends in the thickness direction Y. In the thickness direction Y, a clearance gap is preformed between a surface of the positioning groove 113 opposing to the first protrusion 114 and a tip of the first protrusion 114. When the first connecting segment 121 has a thickness equal to that of the free-end section 123b of the second connecting segment 123, a dimension of the clearance gap in the thickness direction Y is slightly smaller than the thickness of the first connecting segment 121 or the free-end section 123b of the second connecting segment 123. As such, when a predetermined compressive force is applied to the rigid connecting plate 12 and the rigid connecting plate 12 is pressed into the positioning groove 113 of the rigid base plate 11, a portion of the first connecting segment 121 and a portion of the free-end section 123b of the second connecting segment 123 of the rigid connecting plate 12 without the first recesses 124 can smoothly pass through the clearance gap. Finally, the first protrusion 114 enters and fits into the first recess 124 such that the rigid connecting plate 12 and the rigid base plate 11 are fixedly connected. When it is necessary to take out the rigid connecting plate 12, a tensile force is applied to the rigid connecting plate 12 and the rigid connecting plate 12 is generally pulled out.

Optionally, each of the first connecting segment 121 and the free-end section 123b of the second connecting segment 123 of the rigid connecting plate 12 comprises two or more first recesses 124. The two or more first recesses 124 are disposed at intervals along the height direction. The first recess 124 according to the embodiment is a through hole. The through hole extends in the thickness direction Y of the composite end plate 1.

In an embodiment, the transferring section 123a protrudes from the opening of the positioning groove 113, such that the side plate 2 can be fixedly connected to a surface of the transferring section 123a away from the first surface 1a.

In an embodiment, as shown in FIG. 6 and FIG. 7, the end 11a of the rigid base plate 11 comprises a positioning surface 115 on the same side with the second surface 1b. The opening of the positioning groove 113 is disposed in the positioning surface 115. The surface of the transferring section 123a of the second connecting segment 123 away from the first surface 1a is flush with the positioning surface 115. As such, it is avoided that the transferring section 123a lifts the side plate 2 and thus a lifted end of the side plate 2 adversely influences the welding process. Therefore, it is beneficial to weld the end of the side plate 2 to the transferring section 123a. Furthermore, when an end of the side plate 2 is fixedly connected to the transferring section 123a of the rigid connecting plate 12, the side plate 2 can contact with both the positioning surface 115 and the surface of the transferring section 123a away from the first surface 1a. It is avoided that the transferring section 123a lifts the side plate 2 such that there is a gap between the side plate 2 and the positioning surface 115. Therefore, it is possible to increase areas of the side plate 2 and the rigid base plate 11 on which forces act, and provide more uniform stress state in the composite end plate 1.

According to embodiments of the disclosure, the intermediate transitional segment 122 of the rigid connecting plate 12 extends in the thickness direction Y, and mainly bears forces in the width direction X, such as tensile forces transferred from the side plate 2 to the rigid connecting plate 12. The first connecting segment 121 and the second connecting segment 123 are disposed at two respective sides of the intermediate transitional segment 122 such that the rigid connecting plate 12 has a stepped shape. Accordingly, the positioning groove 113 has a stepped shape in its cross section. The first connecting segment 121 and the second connecting segment 123 mainly bear forces in the thickness direction Y. In this case, the rigid connecting plate 12 can bear forces in both the width direction X and the thickness direction Y, and thus has a good bearing capacity and a good positional stability. Optionally, the first connecting segment 121 and the second connecting segment 123 are disposed parallel to each other. More optionally, both the first connecting segment 121 and the second connecting segment 123 are perpendicular to the intermediate transitional segment 122.

According to embodiments of the disclosure, the composite end plate 1 comprises the rigid base plate 11 and the rigid connecting plate 12. The rigid connecting plate 12 is fixedly connected to the rigid base plate 11. The two ends 11a of the rigid base plate 11 opposite to each other in its width direction X are connected to two respective rigid connecting plates 12. A surface of the rigid connecting plate 12 is exposed at the same side with the second surface 1b of the composite end plate 1 and can be fixedly connected to the side plate 2. The rigid connecting plate 12 provides an indirect connection between the rigid base plate 11 and an external structural component. The side plate 2 can be fixedly connected to the rigid base plate 11 via the rigid connecting plate 12, thus it is beneficial to select different materials of the side plate 2 and the rigid connecting plate 12 according to actual requirements in application. The material of the rigid base plate 11 can also be flexibly selected. Thus, it is possible to select low density material to achieve an overall lightweight design of the composite end plate 1 and thereby an overall lightweight design of the battery module. The rigid connecting plate 12 and the rigid connecting plate 12 can be made of same material and can be connected through welding. As such, the rigid connecting plate 12 and the side plate 2 can be fixedly connected through a welding process. Welding seam formed between them has high seam strength and good resistance to tension such that the composite end plate 1 can bear larger expansion forces resulted from the battery expansion and it is possible to improve overall structural reliability of the battery module.

According to embodiments of the disclosure, there is further provided a battery module, comprising a plurality of batteries and a fixing frame. The batteries are arranged side by side in a direction. The fixing frame encloses and fixes all the batteries at a periphery of the batteries. The fixing frame comprises two side plates 2 and two composite end plates 1 according to embodiments of the disclosure. The batteries form an assembly. The two composite end plates 1 are disposed at two opposite sides of the assembly in the battery arrangement direction.

The first surface 1a of the composite end plate 1 is disposed to face the battery. The composite end plates 1 and the side plates 2 are successively and alternatively disposed to surround all the batteries. The two side plates 2 are disposed at two opposite sides of the assembly in a direction perpendicular to the battery arrangement direction. The composite end plates 1 and the side plates 2 are successively and alternatively disposed to surround all the batteries. The side plate 2 and the rigid connecting plate 12 are made of an identical material. The two composite end plates 1 disposed at the two respective sides of the batteries are connected via the two side plates 2. Optionally, each side plate 2 has a U-shaped structure. Two free ends of the side plate 2 are bent to the side of the second surface 1b and are fixedly connected to the transferring sections 123a of the rigid connecting plates 12.

As such, the transferring section 123a of the rigid connecting plate 12 and the side plate 2 can be fixedly connected through a welding process. Welding seam between them formed in the welding process has high seam strength and can bear larger expansion forces resulted from the battery expansion. It is possible to effectively reduce the movement or deformation of the composite end plate 1 in a direction away from the batteries and improve overall structural reliability of the battery module. In an embodiment, the side plate 2 and the rigid connecting plate 12 are made of steel. Preferably, the side plate 2 and the rigid connecting plate 12 are made of stainless steel.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A composite end plate for a battery module, wherein the battery module comprises two composite end plates and two side plates, wherein the composite end plate comprises a first surface and a second surface disposed opposite to each other in its thickness direction, and the first surface can be disposed to face a battery of the battery module, wherein the composite end plate comprises:
   a rigid base plate comprising two ends opposite to each other in a width direction of the composite end plate; and
   two rigid connecting plates, wherein each rigid connecting plate extends in a height direction of the composite end plate, wherein the rigid connecting plates and the rigid base plate are made of different materials, each rigid connecting plate comprises a first connecting segment, an intermediate transitional segment and a second connecting segment disposed successively in the width direction, and the second connecting segment comprises a transferring section connected to the intermediate transitional segment and a free-end section,
   wherein the two ends of the rigid base plate are fixedly connected to the two rigid connecting plates, and the transferring section of the second connecting segment is exposed from the second surface and can be fixedly connected to a corresponding side plate, and wherein each rigid connecting plate is made of metal materials;
   wherein for each rigid connecting plate, both the first connecting segment and the free-end section of the second connecting segment comprise first recesses, and the rigid base plate comprises first protrusions for being inserted into and meshing with the first recesses such that the rigid connecting plate is fixedly connected to the rigid base plate;
   for each rigid connecting plate, the first connecting segment and the free-end section of the second connecting segment are embedded in the rigid base plate such that the rigid connecting plate is fixedly connected to the rigid base plate; and
   the rigid base plate comprises two positioning grooves each having a shape matching with that of each rigid connecting plate, each positioning groove extends in the height direction of the composite end plate, and each rigid connecting plate is inserted into a corresponding positioning groove along the height direction, and
   the first protrusion protrudes toward the positioning groove in the thickness direction, and in the thickness direction, a clearance gap is preformed between a surface of the positioning groove opposing to the first protrusion and a tip of the first protrusion.

2. The composite end plate according to claim 1, wherein the rigid base plate is made of metal materials.

3. The composite end plate according to claim 1, wherein for each rigid connecting plate, the intermediate transitional segment extends in the thickness direction, and the first connecting segment and the second connecting segment are disposed at two respective sides of the intermediate transitional segment such that the rigid connecting plate has a stepped shape.

4. The composite end plate according to claim 1, wherein for each rigid connecting plate, the first connecting segment and the free-end section of the second connecting segment are fixedly connected to the rigid base plate via fasteners, respectively.

5. The composite end plate according to claim 1, wherein the first recess is a notch or through hole, and a portion of the rigid base plate protruding toward the first recess forms the first protrusion.

6. The composite end plate according to claim 1, wherein each end of the rigid base plate comprises a positioning surface on the same side with the second surface, and a surface of the transferring section of the second connecting segment away from the first surface of each rigid connecting plate is flush with a corresponding positioning surface.

7. The composite end plate according to claim 1, wherein the rigid base plate is made of non-metal material.

8. The composite end plate according to claim 2, wherein for each rigid connecting plate, the first connecting segment and the free-end section of the second connecting segment are fixedly connected to the rigid base plate via fasteners, respectively.

9. The composite end plate according to claim 2, wherein for each rigid connecting plate, the intermediate transitional segment extends in the thickness direction, and the first connecting segment and the second connecting segment are disposed at two respective sides of the intermediate transitional segment such that the rigid connecting plate has a stepped shape.

10. The composite end plate according to claim 7, wherein for each rigid connecting plate, the intermediate transitional segment extends in the thickness direction, and the first connecting segment and the second connecting segment are disposed at two respective sides of the intermediate transitional segment such that the rigid connecting plate has a stepped shape.

11. A battery module comprising:
    a plurality of batteries arranged side by side; and
    a fixing frame enclosing all the batteries at a periphery of the batteries, wherein the fixing frame comprises two composite end plates according to claim 1 and two side plates, the composite end plates and the side plates are successively and alternatively disposed to surround the batteries, each side plate and each rigid connecting plate are made of an identical material and each side plate is fixedly connected to a corresponding transferring section of the second connecting segment.

12. The battery module according to claim 11, wherein the rigid base plate is made of metal materials.

13. The battery module according to claim 11, wherein the rigid base plate is made of non-metal material.

14. The battery module according to claim 11, wherein for each rigid connecting plate, the intermediate transitional segment extends in the thickness direction, and the first connecting segment and the second connecting segment are disposed at two respective sides of the intermediate transitional segment such that the rigid connecting plate has a stepped shape.

15. The composite end plate according to claim 7, wherein for each rigid connecting plate, the first connecting segment and the free-end section of the second connecting segment are fixedly connected to the rigid base plate via fasteners, respectively.

16. The composite end plate according to claim 3, wherein for each rigid connecting plate, the first connecting segment and the free-end section of the second connecting segment are fixedly connected to the rigid base plate via fasteners, respectively.

17. The composite end plate according to claim 10, wherein for each rigid connecting plate, the first connecting segment and the free-end section of the second connecting segment are fixedly connected to the rigid base plate via fasteners, respectively.

18. The composite end plate according to claim 2, wherein the first recess is a notch or through hole, and a portion of the rigid base plate protruding toward the first recess forms the first protrusion.

19. The composite end plate according to claim 7, wherein the first recess is a notch or through hole, and a portion of the rigid base plate protruding toward the first recess forms the first protrusion.

20. The composite end plate according to claim 2, wherein each end of the rigid base plate comprises a positioning surface on the same side with the second surface, and a surface of the transferring section of the second connecting segment away from the first surface of each rigid connecting plate is flush with a corresponding positioning surface.

\* \* \* \* \*